US005212464A

United States Patent [19]

Sakai

[11] Patent Number: 5,212,464

[45] Date of Patent: May 18, 1993

[54] MAGNETIC CARD SWITCH

[76] Inventor: Nobuyo Sakai, 27-3, Komagome 6-chome, Toshima-ku, Tokyo, Japan

[21] Appl. No.: 829,056

[22] PCT Filed: Aug. 8, 1990

[86] PCT No.: PCT/JP90/01012

§ 371 Date: Feb. 7, 1992

§ 102(e) Date: Feb. 7, 1992

[87] PCT Pub. No.: WO91/02368

PCT Pub. Date: Feb. 21, 1991

[30] Foreign Application Priority Data

Aug. 10, 1989 [JP] Japan ................................ 1-205653

[51] Int. Cl.$^5$ ............................................ H01M 9/00

[52] U.S. Cl. ...................................... 335/207; 70/455; 235/382

[58] Field of Search ................................ 335/205-207; 200/46; 235/382, 382.5, 449, 493; 70/455, 463

[56] References Cited

U.S. PATENT DOCUMENTS

| | | | |
|---|---|---|---|
| 3,763,676 | 10/1973 | Schachter et al. | 70/276 |
| 3,995,145 | 11/1976 | Harris, IV | 200/46 |
| 4,029,945 | 6/1977 | Yamada et al. | 346/745 |
| 4,602,150 | 7/1986 | Nishikawa et al. | 235/382 |
| 4,629,875 | 12/1986 | Uemura | 235/450 |
| 4,805,722 | 2/1989 | Keating et al. | 340/63 |
| 4,855,383 | 8/1989 | Fraser et al. | 235/492 |
| 4,936,896 | 6/1990 | Takatsuka | 70/432 |
| 5,057,677 | 10/1991 | Bertagna et al. | 235/381 |

*Primary Examiner*—Lincoln Donovan

*Attorney, Agent, or Firm*—Wenderoth, Lind & Ponack

[57] ABSTRACT

A magnetic card switch designed so that it's possible to turn on the switch, hold it in an "on" state, turn it off and open the switch casing by using magnetic cards. A plurality of magnet lock pins (21) accommodated in a plurality of holes (10) form a predetermined code, which is provided in a slider. Slider lock means being fixedly disposed in a casing along the slider, the slider lock means having a plurality of holes (8) forming a predetermined code, which properly receive one end of the magnet lock pins, and a switch (24) disposed to correspond to the slider. When a first magnetic card (31) is inserted into the casing means, the lock pin (21$a_2$) of the slider move in correspondence with a magnetic code of the card to unlock the slider, so that the slider moves to the backward slide position to change over the switch (24) from an "off" to an "on" or from an "on" to an "off" state. When the slider reaches the backward slide position, the lock pin of the slider moves to lock it again, thereby holding the slider in the backward slide position, and thus holding the switch in the "on" or "off" state even after the first magnetic card (31) has been withdrawn.

13 Claims, 10 Drawing Sheets

MAGNETIC CARD SWITCH

TECHNICAL FIELD

The present invention relates to a magnetic card switch which is designed so as to be able to be turned, held in an "on" state, turned off, and so as for the switch casing to be opened by using a magnetic card.

BACKGROUND ART

A device that effects locking or unlocking, for example, by use of a magnetic card has heretofore been known and disclosed as "Lock Structure", for example, in Japanese Patent Post-Exam Publication No. 58-41391 (1983). This prior art includes a slider which is capable of being moved from a lock position to an unlock position by insertion of a magnetic card comprising a magnetic code, lock pins made of magnets which are disposed within the slider and which are slidable in a direction perpendicular to the sliding direction of the slider, and a lock plate disposed along the slider and having holes for accommodating a projecting part of each of the lock pins projecting from the slider when the slider is set at the lock position.

The above-described prior art suffers, however, from the disadvantage that, when it becomes necessary to inspect the inside of the device because of a failure in the mechanism inside the casing of the lock (i.e., a door knob in this case) or it is desired to change the magnetic code of the magnet lock pins, it is difficult to open, i.e., disassemble, the casing, so that it is considerably troublesome to carry out these operations.

As another prior art, proposed to solve the disadvantage of the above-described prior art, Japanese Patent Post-Exam Publication No. 02-28658 (1990) discloses "Casing of Card Lock". This prior art includes a lower casing member attached, for example, to a wall of a building; an upper casing member being removably attached to the lower casing member, means for connecting the upper casing member to the lower casing by engagement, and a slider that is accommodated in a space defined between the two casing members. The slider is caused to slide by insertion of a suitable magnetic card bearing a magnetic code into the casing to turn on a switch for locking and unlocking and, at the same time, the engagement made by the connecting means is canceled in response to the movement of the slider, thereby enabling the casing to be readily disassembled.

However, according to this prior art, in order to hold the "on" state of the switch, it is necessary to hold the magnetic card within the casing throughout the "on" state. In other words, if the card is pulled out, the switch is automatically turned off. Accordingly, this switch device has a disadvantage that if instead of being applied not to an on-off operation of a lock, it is applied to an on-off control operation of an illumination means, it is troublesome to perform an operation of holding the "on" state for the illumination means. Therefore, it is not practical to apply the device for on-off control in an illumination means. In addition, disassembly of the casing always requires an extra operation, that is, the switch must be turned on at the same time. Therefore, even if the user lends the magnetic card to a third party for an operation of turning on the switch, for example, there is a danger that the third party may disassemble the casing in addition to the switch "on" operation and tamper with the internal mechanism of the lock or change the magnetic code of the magnet lock pins.

DISCLOSURE OF THE INVENTION

It is an object of the present invention to provide a magnetic card switch which is free from the above-described technical problems of the prior art.

A first arrangement of the present invention relates to a magnetic card switch comprising:

casing means attached to a wall of a building or the like;

a slider accommodated in the casing means and slidable in a predetermined direction;

a plurality of magnet lock pins accommodated in a plurality of holes forming a predetermined code, said holes being provided in the slider;

spring means for biasing the slider forwards;

slider lock means for properly locking the slider in either a forward slide position or a backward slide position, the slider lock means being fixedly disposed in the casing along the slider, the slider lock means having a plurality of holes forming a predetermined code, said holes properly receiving one ends of the magnet lock pins; and a switch disposed to correspond to the slider;

wherein the slider is normally in a non-slidable, locked state at the forward slide position with one end of at least one predetermined lock pin being received in the lock means;

when a first magnetic card ("on" key card) (or "off" kay card) is inserted into the casing means, the lock pin of the slider move in correspondence with a magnetic code of the card to unlock the slider, so that the slider moves to the backward slide position to change over the switch from "off" to "on" (or from "on" to "off"); and when the slider reaches the backward slide position, the lock pin of the slider moves to lock it again, thereby holding the slider in the backward slide position, and thus holding the switch in the "on" (or "off") state even after the first magnetic card has been pulled out.

A second arrangement of the present invention relates to a magnetic card switch comprising:

casing means comprising a mounting casing attached to a wall of a building or the like and a cover casing attached to the mounting casing;

a pair of first and second sliders accommodated in the casing means and slidable in a predetermined direction independently of each other, the second slider having an abutment portion against which various kinds of magnetic cards abut;

a plurality of magnet lock pins accommodated in a plurality of holes forming a predetermined code, said holes being provided in the first and second sliders;

spring means for biasing the first and second sliders forwards;

slider lock means for properly locking the first and second sliders in either a forward slide position or a backward slide position, the lock means being fixedly disposed in the casing along the first and second sliders, the lock means having a plurality of holes forming a predetermined code, said holes properly receiving one end of the magnet lock pins;

means for connecting together the mounting casing and the cover casing by engagement, the means being disposed on the first slider; and a switch disposed to correspond to the second slider;

wherein the first and second sliders are normally in a non-slidable, locked state at the forward slide position with one end of a predetermined lock pin received in the lock means;

when a first magnetic card ("on" kay card) (or "off" key card) is inserted into the casing means, the lock pin of the second slider move in correspondence with a magnetic code of the card to unlock the slider, so that the second slider moves to the backward slide position to change over the switch from "on" to "off" or (from "off" to "on"); and when a fifth magnetic card ("open" key card) is inserted into the casing means, the lock pin of the first and second sliders move in correspondence with a magnetic code of the card to unlock the first and second sliders from the lock means and lock the sliders to each other, so that the first and second sliders move together as one unit to cancel the engagement between the mounted casing and the cover casing made by the connecting means, thereby enabling the cover casing to be removed.

In the first arrangement, if a second magnetic card ("off" key card) (or "on" key card) is inserted into the casing when the switch is in an "on" (or "off") hold state, the switch can be turned off (or on).

In the second arrangement, when the first magnetic card ("on" key card) (or "off" key card) is inserted, the second slider can be locked in the backward slide position to hold the switch in the "on" (or "off") state in the same way as in the case of the first arrangement. While the switch is held in the "on" (or "off") state, if the second magnetic card ("off" key card) (or "on" key card) is inserted into the casing, the switch can be turned off (or on).

Further, in the first and second arrangements, a single third magnetic card ("on-off" key card) that has the functions of both the first and second magnetic cards may be used in place of the first and second magnetic cards.

Further, in the first and second arrangements, the slider may have an indicating portion to indicate "on" and "off" states of the switch.

Further, in the first and second arrangements, a fourth magnetic card ("momentary" key card) may be used such that only when the card remains inserted, the switch is kept on (or off), and when the card is pulled out, the switch is immediately turned off (or on).

ADVANTAGES OF THE INVENTION

The first arrangement of the present invention provides the following advantages:

(1) By inserting the first magnetic card into the casing, the switch can be held in an "on" (or "off") state even after the card has been pulled out. Accordingly, this magnetic card switch can be applied not only to an on-off operation of a lock but also to any kind of switch mechanism that requires a switch "on" (or "off") hold state, for example, on-off control operation of an illumination means.

(2) Since a switch "on" (or "off") state can be held, the magnetic card need not be kept (or held) in the inserted state, thus making operation more convenience.

(3) The first magnetic card only enables the switch to be turned on (or off) and another magnetic card is required to return the switch to the "off" (or "on") state. Accordingly, even if the first magnetic card is used by a third party, the latter can only turn on (or off) the switch, but cannot turn off (or on) the switch after turning it on (or off), that is, no extra operation can be performed. Thus, the device is advantageous in terms of security.

The second arrangement of the present invention provides the following advantages:

(1) Since the switch "on" (or "off") operation is performed with the first magnetic card and the casing open (disassemble) enabling operation with the fifth magnetic card, that is, these two operations are performed with two different magnetic cards, even if the first magnetic card is used, for example, by a third party, the latter can only turn on (or off) the switch, but cannot disassemble the casing to tamper with the internal mechanism of the lock or change the magnetic code of the magnet lock pins as in the case of the prior art. Thus, the device is advantageous in terms of security.

According to various embodiments of the present invention, for example, a single magnetic card, i.e., the third magnetic card enables the switch to conduct two operations, that is, the switch being turned on and off conveniently.

In addition, the device is convenient because the "on" and "off" states of the switch can be indicated so as to be visually confirmed easily from the outside.

With the fourth magnetic card, the switch is kept on (or off) only when the card remains inserted.

With the above-described various kinds of card, the operating function of each card is limited. Accordingly, no extra operation can be performed with a single card, so that there is no possibility of an extra operation being carried out when any of these cards is used by a third party.

BEST MODE FOR CARRYING OUT THE INVENTION

Figure 1:
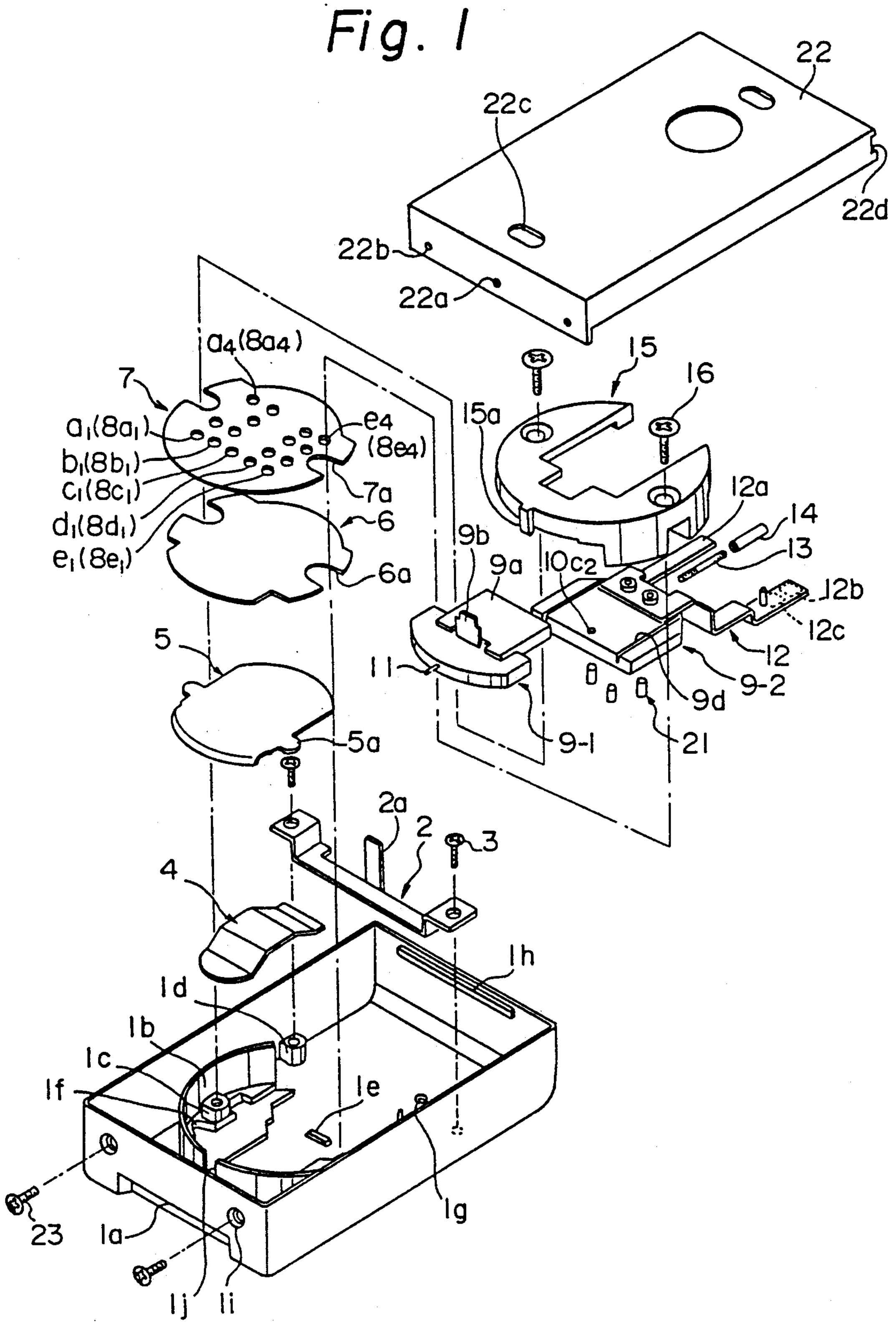
FIG. 1 is an exploded perspective view of one embodiment of the magnetic card switch according to the present invention.
Figure 2:
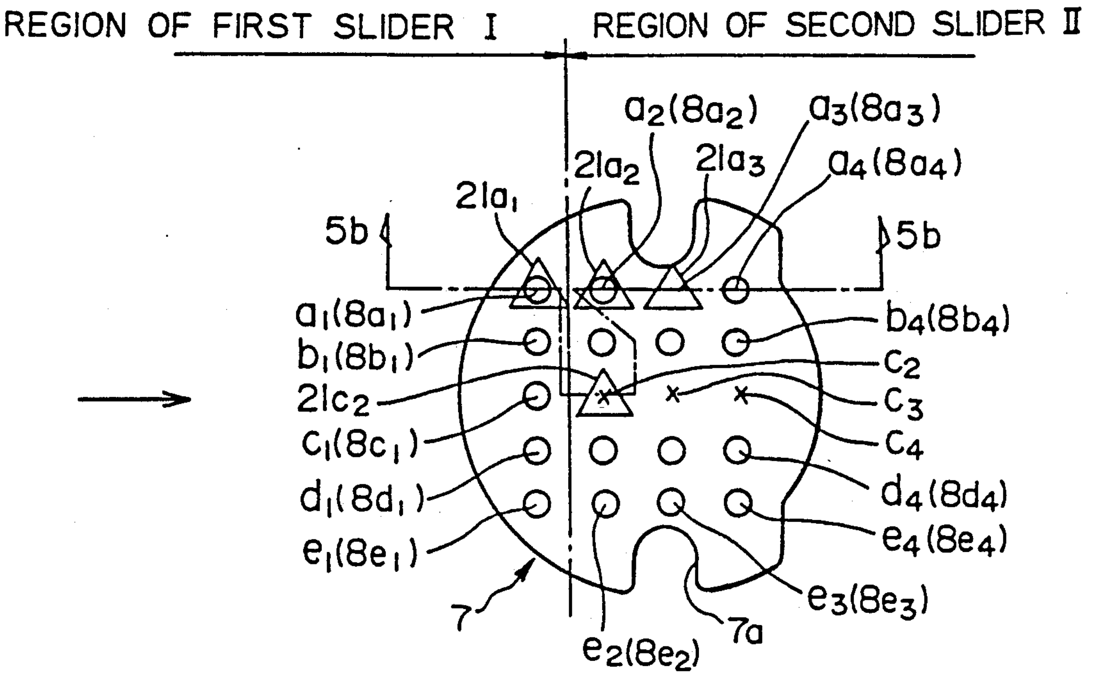
FIG. 2 is a plan view of a lock plate constituting the switch.
Figure 3:
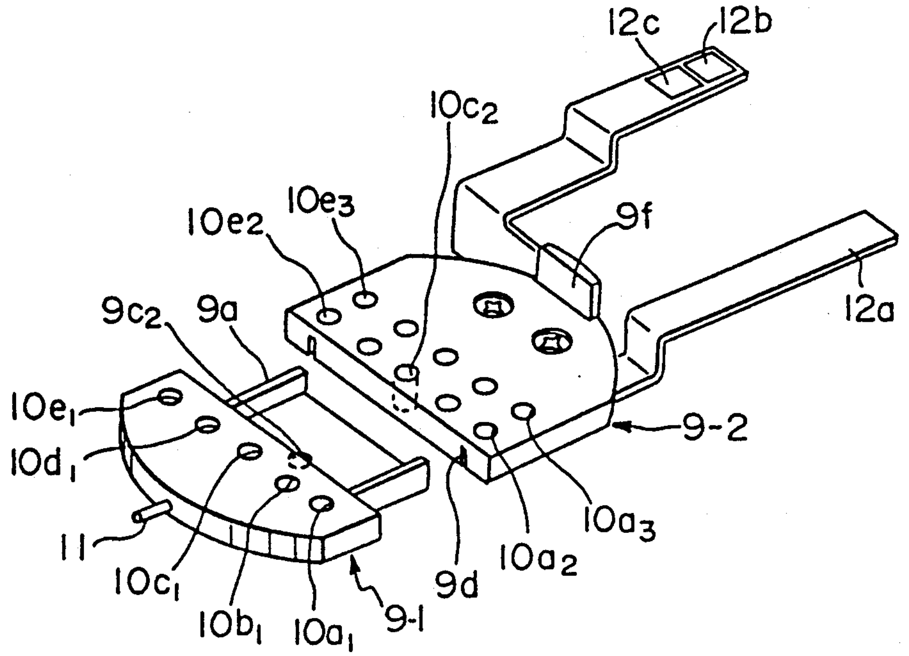
FIG. 3 is an exploded perspective view of first and second sliders constituting the switch as seen from the lower side thereof.
Figure 4:
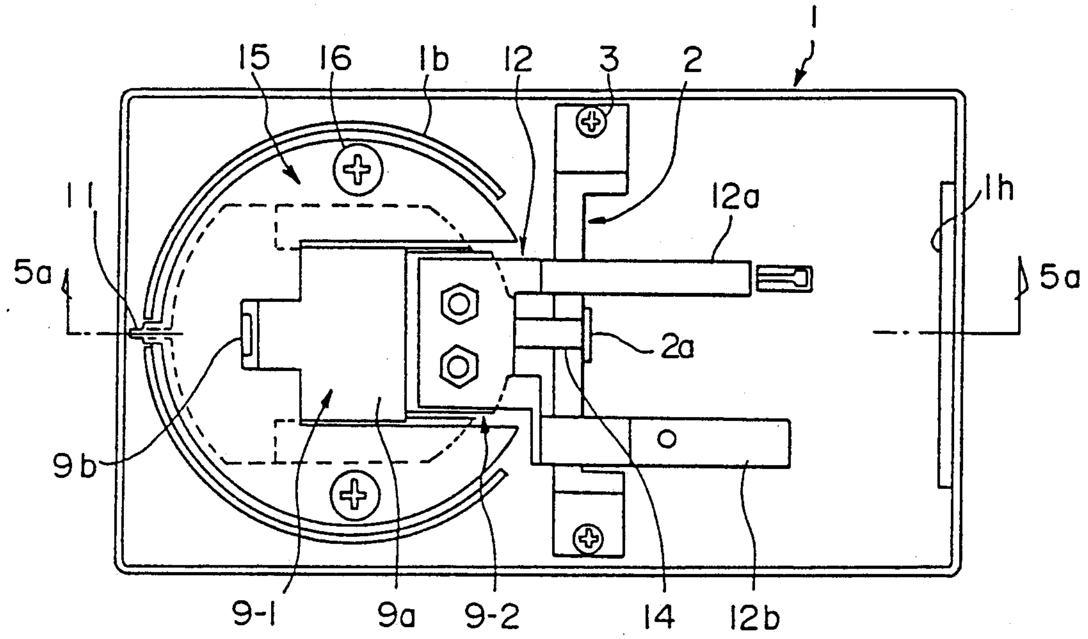
FIG. 4 is a plan view showing the switch in an "off" state with the mounting casing omitted.
Figure 5:
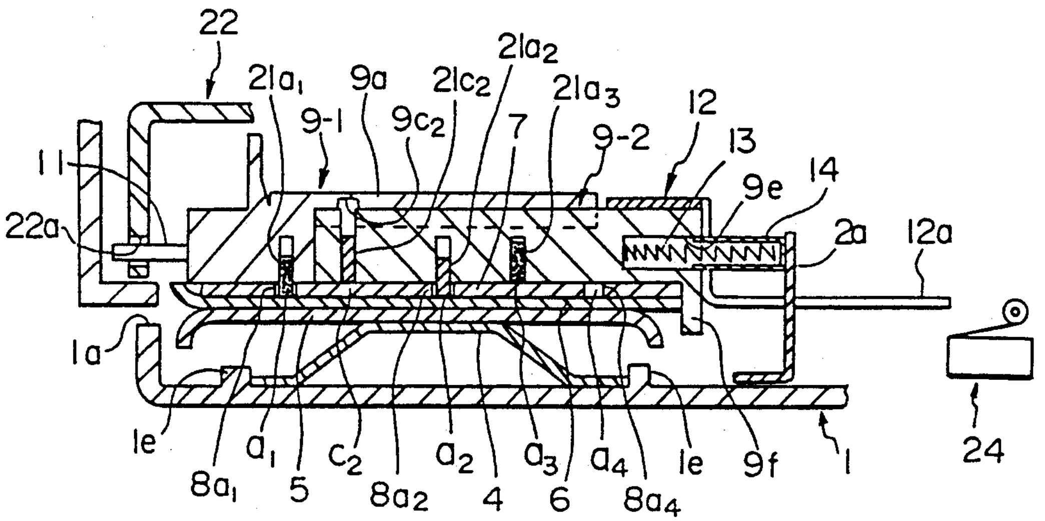
FIG. 5 is a longitudinal sectional view taken along the line **5*a*—5*a* in FIG. 4 (along the line 5*b*—5*b* in FIG. 2** for the lock plate and the sliders)

FIG. 1 is an exploded perspective view of one embodiment of the magnetic card switch according to the present invention, FIG. 2 is a plan view of a lock plate that constitutes the switch, FIG. 3 is an exploded perspective view of a pair of first and second sliders that also constitute the switch as seen from the lower side thereof, FIG. 4 is a plan view of the switch in an "off" state with the mounting casing omitted, and FIG. 5 is a longitudinal sectional view taken along the line 5*a*—5*a* in FIG. 4 (for the lock plate and the sliders, the view is taken along the line 5*b*—5*b* in FIG. 2).

In the figures, the reference numeral 1 denotes a cover casing in the shape of a box the upper side of which is open. The cover casing 1 has a card insertion opening 1*a* (see FIG. 5), a circular wall portion 1*b*, a pair of projections 1*c* (only one illustrated) each having a tapped hole, another pair of projections 1*d* (only one illustrated) each having a tapped hole, leaf spring retaining portions 1*e* (see FIG. 5), a pair of retaining recesses 1*f*, an indicating window 1*g*, an engagement ridge 1*h* for retaining a mounting casing, tapped holes 1*i*, etc.

A coil spring retaining plate 2 has a coil spring retaining portion 2*a* and is secured to the pair of projections 1*d* by means of a pair of screws 3.

A V-shaped leaf spring 4 is disposed in the cover casing 1 and in between the leaf spring retaining portions 1*e*, as shown in FIG. 5.

A magnetic (e.g., iron) plate 5 is adapted to attract all magnet lock pins 21 (described later) basically to the lower side as viewed in FIGS. 1 and 5. The plate 5 is disposed inside the circular wall portion 1*b* in such a manner that projections 5*a* provided on both sides thereof are engaged with the respective retaining recesses 1*f*.

A non-magnetic (e.g., stainless steel) plate 6 is adapted to prevent falling of the magnet lock pins 21 attracted downwards. The plate 6 is disposed inside the circular wall portion 1*b* in such a manner that recesses 6*a* that are provided on both sides thereof are engaged with the respective projections 1*c*.

A non-magnetic (e.g., brass) lock plate 7 has set therein, for example, a total of 20 positions "$a_1$ to $a_4$, $b_1$ to $b_4$, $c_1$ to $c_4$, $d_1$ to $d_4$, and $e_1$ to $e_4$" in a matrix of 4 columns and 5 rows, as shown in FIG. 2. However, if the magnet lock pins are desired to use in correspondence to, for example, "the a-th row and the c-th row", as in this embodiment, no holes are provided at four positions "$a_3$, $c_2$, $c_3$ and $c_4$" in the a-th row and the c-th row among the 20 positions, but through-holes "8$a_1$, 8$a_2$ and 84", "8$b_1$ to 8$b_4$", "8$c_1$", "8$d_1$ to 8$d_4$", and "8$e_1$ to 8$e_4$" are provided at the remaining 16 positions, respectively. Nevertheless, in this embodiment, the through-holes in the rows "b, d and e" are not used in actual practice, as described later. FIG. 5 shows the lock plate 7 in a sectional view taken along the bent line 5*b*—5*b* passing through "the a- and c-th rows" in FIG. 2. In FIG. 5 are shown reference numerals "$a_1$, $c_2$, $a_2$, $a_3$, and $a_4$" for positions corresponding to those shown in FIG. 2. The lock plate 7 is disposed inside the circular wall portion 1*b* in such a manner that recesses 7*a* that are provided on both sides thereof are engaged with the respective projections 1*c*.

It should be noted that in FIG. 2 a first slider region I is a region where, when set in a switch "off" position (i.e., forward slide position), a first slider 9-1, described below, is superposed on the lock plate 7 to cover it. A second slider region II means a region where, when set in a switch "off" position (i.e., forward slide position), a second slider 9-2 is superposed on the lock plate 7 to cover it in the same way as above.

Reference numeral 9-1 denotes a flat plate-shaped first slider made of a resin material. The first slider 9-1 has a total of five holes $10_1$ to 10$e_1$ (all blind holes with a predetermined depth, opening side of which facing the lock plate 7) for accommodating magnet lock pins 21, the holes being arranged in a matrix of 1 column and 5 rows at respective positions corresponding to the positions "$a_1$ to $e_1$" in the first slider region I of the lock plate 7 shown in FIG. 2, as shown in FIG. 3 (the upper side as viewed in the figure is actually the bottom side). The first slider 9-1 further has a guide portion 9*a* with a U-shaped cross-sectional configuration, a stopper portion 9*b* provided on the top, and a metallic engagement pin 11 provided on the forward end face of the slider 9-1. It should be noted that the guide portion 9*a* has a blind hole 9$c_2$ at a position which corresponds to the position "$c_2$" when the first slider 9-1 is in the forward slide position, as shown in FIGS. 3 and 5.

Reference numeral 9-2 denotes a flat plate-shaped second slider similarly made of a resin material. The second slider 9-2 has a total of 10 magnet lock pin accommodating holes 10$a_2$, 10$a_3$; 10$b_2$, 10$b_3$; 10$c_2$, 10$c_3$; 10$d_2$, 10$d_3$; and 10$e_2$, 10$e_3$ (only the hole 10$c_2$ at the position corresponding to the position "$c_2$" is a vertically through-hole, as shown in FIG. 5, while the other holes are all blind holes with a predetermined width, an opening side of which faces the lock plate 7) in a matrix of 2 columns and 5 rows at respective positions corresponding to the positions "$a_2$, $a_3$; $b_2$, $b_3$; $c_2$, $c_3$; $d_2$, $d_3$; and $e_2$, $e_3$" in the second slider region II of the lock plate 7 shown in FIG. 2, as shown in FIG. 3. The second slider 9-2 further has a pair of guide grooves 9*d* provided in the top, a coil spring accommodating hole 9*e* in the rear end face, and a card abutment portion 9*f* provided on the bottom (see FIG. 5 for these portions). In addition, the second slider 9-2 has a switch actuating and indicating plate 12 screwed thereto. The plate 12 has a switch actuating portion 12*a*, and a pair of switch position indicating portions, that is, a red portion (indicating "switch off") 12*b* and a green portion (indicating "switch on") 12*c*.

The first and second sliders 9-1 and 9-2 are assembled together by inserting the guide portion 9*a* of the former into the guide grooves 9*d* so that these sliders are slidable independently of each other in the forward and backward directions. The slider assembly is placed on the upper surface of the lock plate 7 inside the circular wall portion 1*b*. At this time, the second slider 9-2 is biased forwards (leftwards as viewed in FIG. 5) by a coil spring 13 disposed between the same and the coil spring retaining portion 2*a* of the stopper plate 2 (the coil spring 13 being guided by a cylindrical member 14), so that the second slider 9-2 abuts against the first slider 9-1, and the two sliders 9-1 and 9-2 are further biased in the same direction, as shown in FIG. 5.

A circular holder plate 15 made of a resin material is fitted into the circular wall portion 1*b* such that an engagement projection 15*a* engages with the upper portion of a slit 1*j* in the wall portion 1*b*, and the holder plate 15 is rigidly secured to the pair of projections 1*c* by using screws 16.

Accordingly, in the slider assembly comprising the two sliders 9-1 and 9-2 biased forwards, for example, the first slider 9-1 is in the switch "off" position (the forward slide position) shown in FIG. 5 with the stopper portion 9*b* abutting against a predetermined portion of the holder plate 15. At this time, the holes "10*a*1 to 10*a*3, 10*b*1 to 10*b*3, . . . " in the two sliders 9-1 and 9-2 correspond to the respective positions "$a_1$ to $a_3$, $b_1$ to $b_3$, . . . " with the corresponding symbols on the lock plate 7. Accordingly, the holes also face the respective through-holes "8*a*1, 8*a*2; 8*b*1 to 8*b*3, 8*c*1; 8*d*1 to 8*d*3, 8*e*1 to 8*e*3" with the corresponding symbols in the lock plate 7. In addition, the engagement pin 11 extends forwards through the lower portion of the slit 1*j* in the circular wall portion 1*b* and engages with an engagement hole 22*a* in a mounting casing 22 (described later), thereby rigidly securing the cover casing 1 and the mounting casing 22 to each other. Thereafter, the sliding of the two sliders 9-1 and 9-2 in the forward and backward directions is guided accurately by a guide portion (not shown) of the holder plate 15.

In addition, when no magnetic card is inserted, the magnetic plate 5 is biased upwards by the leaf spring 4 to abut against the non-magnetic plate 6, and each time a magnetic card is inserted into the area between the two plates 5 and 6, the magnetic plate 5 is pushed down against the leaf spring 4.

Further, in the switch "off" position shown in FIG. 5, the switch actuating portion 12*a* of the plate 12 is placed to turn off a switch 24 attached inside the cover casing 1, and the red portion 12*b* of the plate 12 is observable from the outside through the window portion 1*g*, thus indicating the switch "off" state.

Four magnet lock pins 21 (21*a*1, 21*a*2, 21*a*3 and 21*c*2) are inserted in the holes 10*a*1, 10*a*2, 10*a*3 and 10*c*2 with the corresponding symbols in the first and second sliders 9-1 and 9-2, as shown in FIGS. 2 and 5. In FIG. 2, these magnet lock pin positions are denoted by for facilitating understanding. As will be clear from FIG. 5, the lock pins 21*a*1 and 21*a*3 are magnets the lower portions of which are S-poles, and this type of magnetic pole is shown by "dotted pattern", whereas the other lock pins 21*a*2 and 21*c*2 are magnets the lower portions of which are N poles, and this type of magnetic pole is shown by "solid black pattern".

In any case, in the switch "off" state shown in FIG. 5, that is, in a state where no card is inserted, all the four lock pins are attracted downwards as viewed in FIG. 5 by the magnetic plate 5. Accordingly, the two lock pins 21*a*1 and 21*a*2 fall down into and extend through the respective holes 8*a*1 and 8*a*2 (with the corresponding symbols) in the lock plate 7 until they abut against the non-magnetic plate 6. Thus, the first and second sliders 9-1 and 9-2 are fixed in the switch "off" position with their relative slide positions to the lock plate 7 locked through the lock pins 21*a*1 and 21*a*2, respectively. At this time, the other two lock pins 21*c*2 and 21*a*3 merely abut against the respective positions "$c_2$ and $a_3$" on the lock plate 7 where no through-holes are provided.

A mounting casing 22 has, as shown in FIG. 1, an engagement hole 22*a* and a pair of tapped holes 22*b*, which are provided in the forward end face, mounting holes 22*c* in the top, an engagement recess 22*d* in the rear end face, etc. The mounting casing 22 is attached to a wall surface of a building, for example, in advance by using the mounting holes 22*c* in such a manner that the left end of the mounting casing 22 as viewed in FIG. 1 is defined as the lower end, for example. The assembled cover casing 1 is put over the mounting casing 22 by pivoting the former with the engagement ridge 1*h* engaged with the engagement recess 22*d*, and a pair of screws 23 are threaded into the tapped holes 22*b* through the holes 1*i*, thereby securing the cover casing 1 to the mounting casing 22. At this time, the engagement pin 11 on the first slider 9-1 is temporarily slid a little backwards together with the slider 9-1. In this state, the cover casing 1 is attached to the mounting casing 22, and thereafter, the engagement pin 11 is slid forwards to engage with the engagement hole 22*a*, as stated above.

By virtue of the engagement between the engagement pin 11 and the engagement hole 22*a*, any malicious third party cannot detach the cover casing 1 from the mounting casing 22 simply by removing the screws 23 from the outside, thus preventing the switch in the casing from being actuated undesirably.

Figure 15:
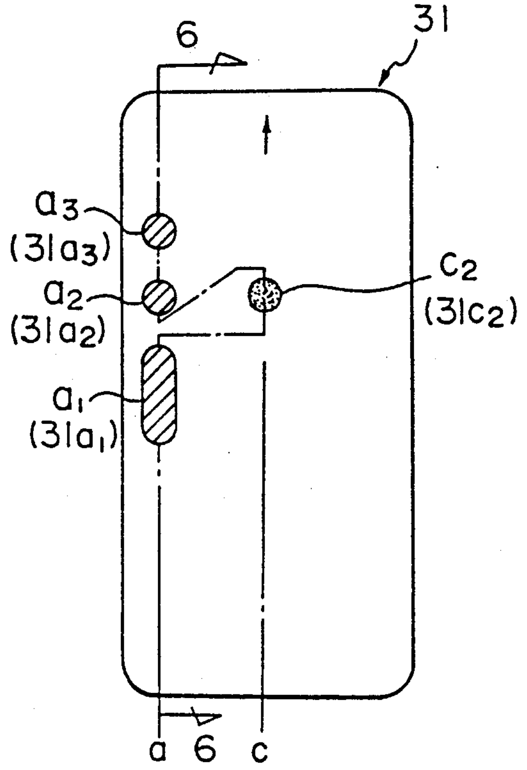
FIGS. 15 to 19 are plan views showing an "on" key card, an "off" key card, a "momentary" key card, an "open" key card, and an "on-off" key card, respectively.
Figure 16:
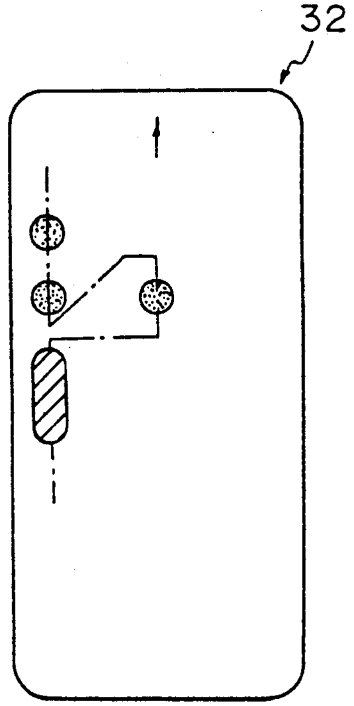
Figure 17:
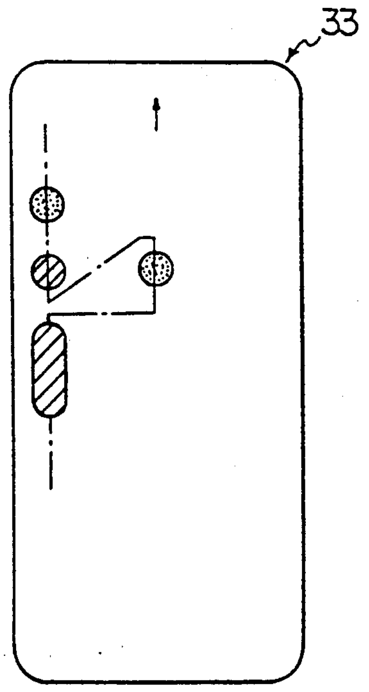
Figure 18:
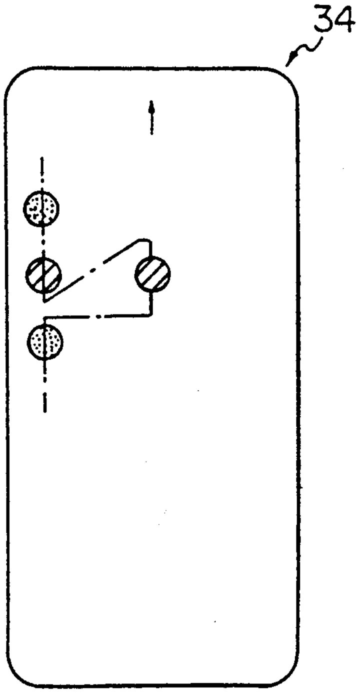
Figure 19:
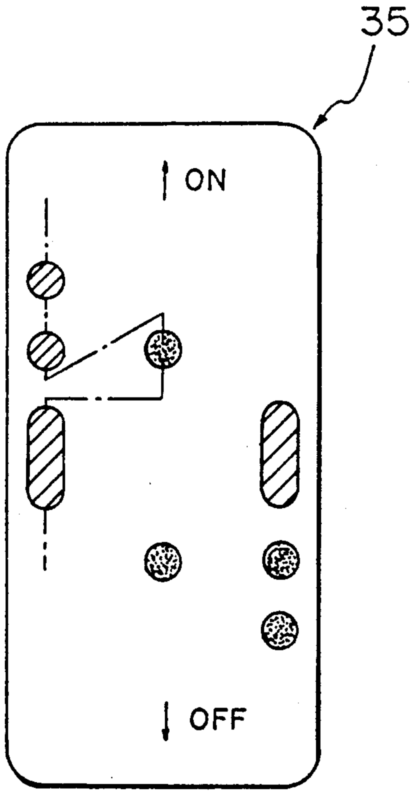

FIGS. 15 to 19 show various kinds of magnetic card used by being inserted into the above-described switch assembly. FIG. 15 shows an "on" key card 31, FIG. 16 shows an "off" key card 32, FIG. 17 shows a "momentary" key card 33, and FIG. 18 shows an "open" key card. Each card has S-pole magnets shown by "dotted pattern" or N-pole magnets shown by "solid black pattern" properly buried along the bent line 6—6 in FIG. 15 (the same as the line 5*b*—5*b* for the lock plate 7 in FIG. 2), that is, at respective positions corresponding to the positions "$a_1$, $c_2$, $a_2$, and $a_3$" on the lock plate 7 (the polarity of each of the magnets buried in the card is herein assumed to be that manifested by a side of the magnet which faces the magnet lock pins 21 when the card is inserted). FIG. 19 shows an "on-off" key card 35 formed by combining together the "on" key card 31 and the "off" key card 32.

The operation of the above-described magnetic card switch will be explained below.

Figure 6:
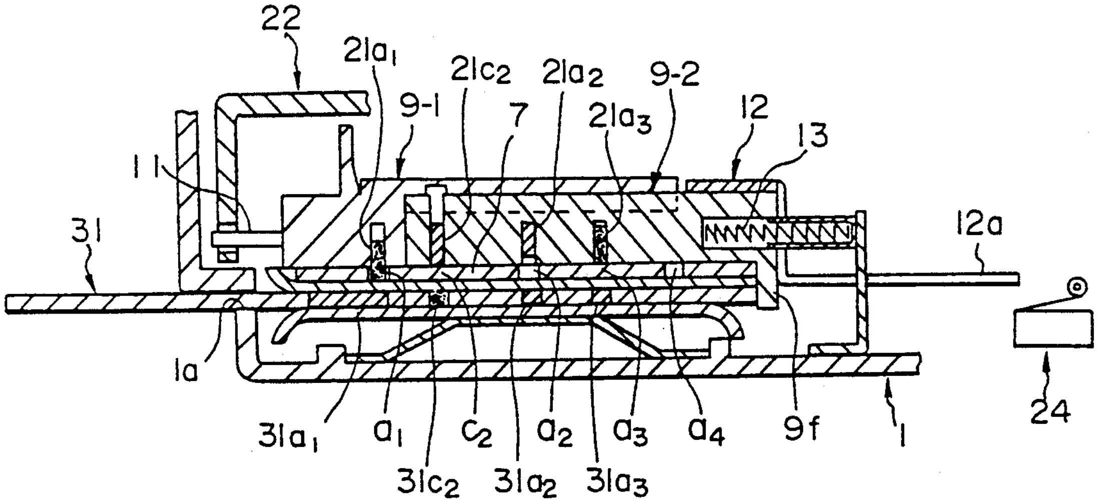
FIG. 6 is a longitudinal sectional view of the mechanism shown in FIG. 5, with an "on" key card inserted therein as far as a halfway position (the card being shown in a section taken along the line 6—6 in FIG. 15)

First, to hold the switch 24 in an "on" state, the "on" key card 31 (having N-, S-, and N-pole magnets buried in the respective positions "$a_1$, $c_2$, $a_2$ and $a_3$ ") shown in FIG. 15 is inserted into the assembly from the card insertion opening 1*a* at the left-hand side as viewed in FIG. 6 until it abuts against the abutment portion 9*f* of the second slider 9-2. The section of the card shown in FIG. 6 is taken along the line 6-6 in FIG. 15; the same is the case with the following drawings.

In consequence, as shown in FIG. 6, the magnet lock pins 21*a*1, 21*c*2and 21*a*3, which are disposed successively in the mentioned order from the left-hand side as viewed in the figure, in the two sliders 9-1 and 9-2 correspond to the respective magnets buried in the "on" key card 31 at the corresponding positions. Accordingly, the lock pins 21*a*1, 21*c*2 and 21*a*3, excluding the lock pins 21*a*2, correspond to respective buried magnets which have opposite polarities to those lock pins 21*a*1, 21*c*2 and 21*a*3, so that these lock pins are attracted downwards to keep the same positions as those in FIG. 5. However, only the lock pin 21*a*2corresponds to a buried magnet having the same polarity and is repelled thereby to move upwards, so that the second slider 9-2 is unlocked from the lock plate 7, that is, it becomes slidable.

Figure 7:
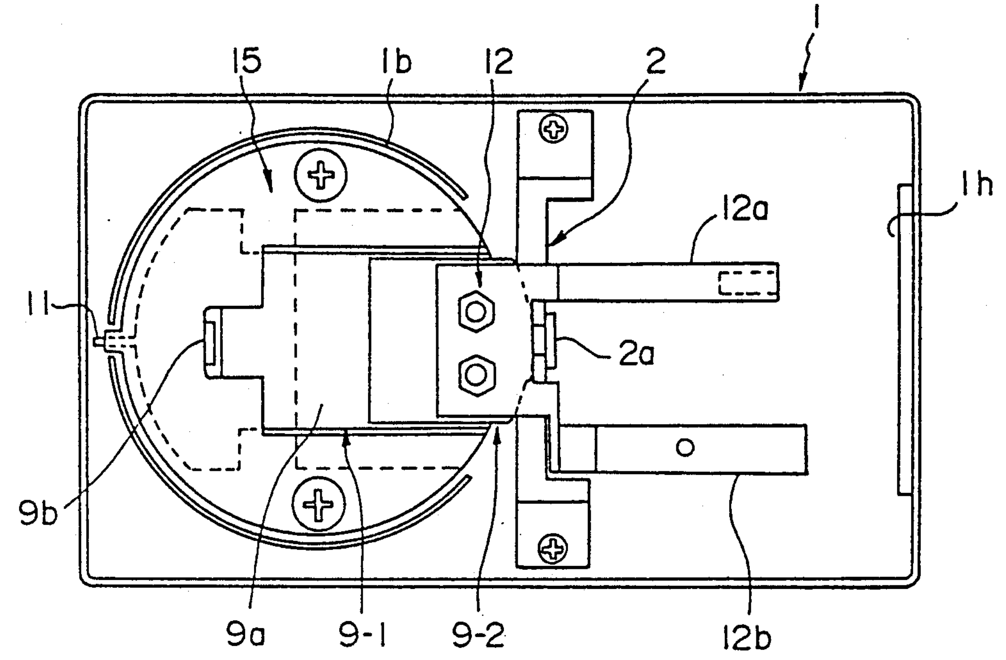
FIGS. 7 and 8 are plan and longitudinal sectional views, respectively, showing the switch in an "on" hold state with the "on" key card pushed therein as far as the backward extremity.
Figure 8:
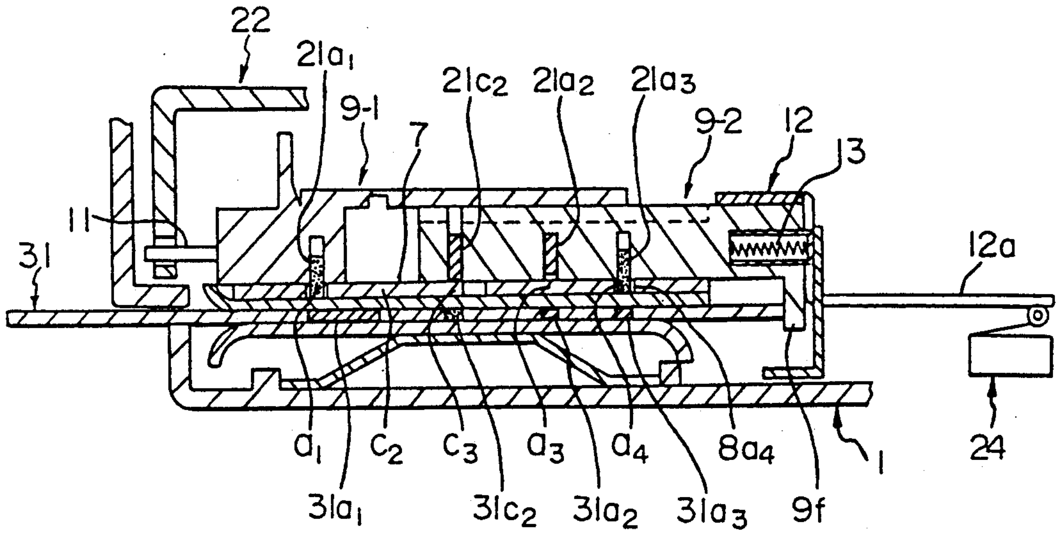

Accordingly, if the "on" key card 31 is further pushed into against the coil spring 13, the second slider 9-2 slides backwards together with the "on" key card 31 as one unit to reach the position shown in FIGS. 7 and 8. Thus, the lock pins 21$c_2$, 21$a_2$ and 21$a_3$ move from the respective positions "$c_2$, $a_2$ and $a_3$" with respect to the lock plate 7 shown in FIG. 5 to the respective positions "$c_3$, $a_3$ and $a_4$". However, since no through-holes are provided at the positions "$c_3$ and $a_3$" on the lock plate 7, there is no possibility that the lock pin 21$c_2$ or 21$a_2$ will move downwards. On the other hand, the through-hole 8$a_4$ is provided at the position "$a_4$" corresponding to the rightmost lock pin 21$a_3$; therefore, the lock pin 21$a_3$ is attracted by the magnet of the opposite polarity embedded in the card 31 and falls down into the hole 8$a_4$, thereby locking (holding) the second slider 9-2 in the backward slide position through the lock pin 21$a_3$.

At this time, as shown in FIGS. 7 and 8, the switch actuating portion 12$a$ presses the switch 24 to change over it to a switch "on" state. 7 and 8. At the same time, the green portion 12$c$ of the plate 12 is displayed through the window portion 1$g$ to indicate the switch "on" state.

Even if the card 31 is pulled out subsequently, all the lock pins 21$a_1$, 21$c_2$, 21$a_2$ and 21$a_3$ are continuously attracted by the magnetic plate 5, so that the same conditions as those shown in FIG. 8 are maintained. Accordingly, the above-described switch "on" state is held.

Figure 9:
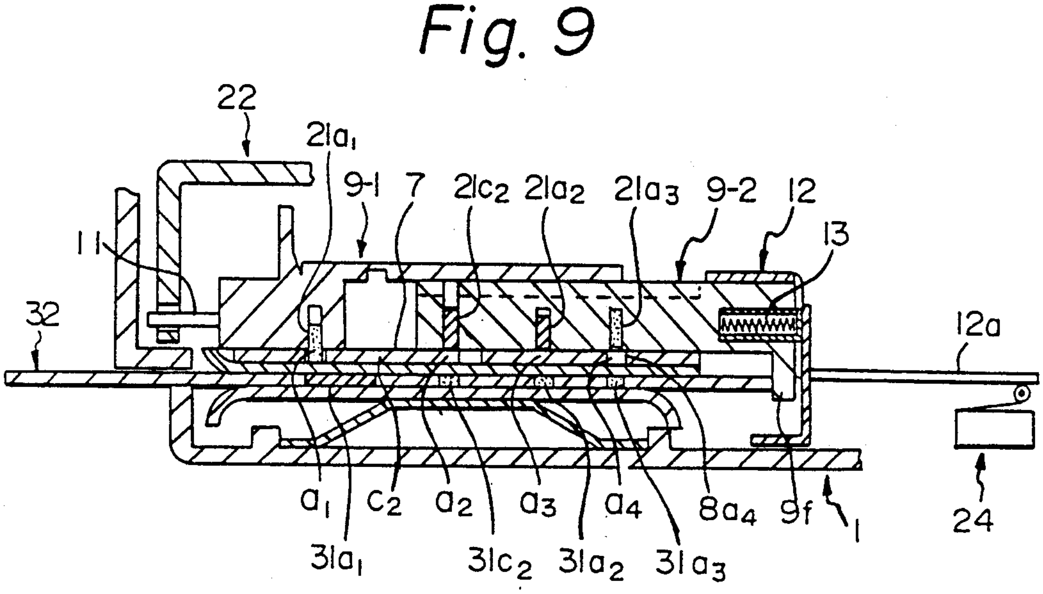
FIG. 9 is a longitudinal sectional view of the switch in the "on" hold state with an "off" key card pushed therein as far as the backward extremity.

Next, to cancel the switch "on" hold state shown in FIG. 8 and establish a switch "off" state, the "off" key card 32 (having N-, S-, S- and S-pole magnets buried at respective positions "$a_1$, $c_2$, $a_2$ and $a_3$") shown in FIG. 16 is first inserted until it abuts against the abutment portion 9$f$ at the backward slide position, as shown in FIG. 9. In consequence, only the rightmost lock pin 21$a_3$ corresponds to a magnet of the same polarity buried in the card 32, so that the lock pin 21$a_3$ is repelled by the magnet to come upwards out of the hole 8$a_4$ in the lock plate 7, thereby unlocking the second slider 9-2 and enabling it to slide.

Accordingly, if the card 32 is pulled out from the device in the state shown in FIG. 9, the second slider 9-2 is also slid leftwards by the resilient force from the coil spring 13 to return to the state shown in FIG. 5. At this time, the lock pin 21$a_2$ falls into the through-hole 8$a_2$ again to lock the second slider 9-2 in the initial position, as shown in FIG. 5. Accordingly, the switch 24 turns off, and the red portion 12$b$ is displayed through the window portion 1$g$ to indicate the switch "off" state.

Figure 10:
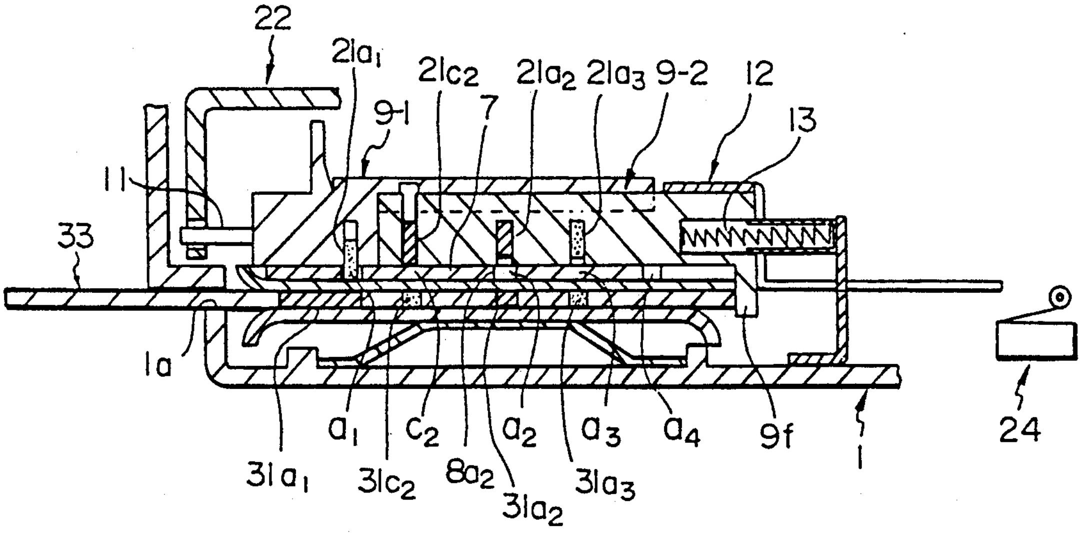
FIG. 10 is a longitudinal sectional view of the switch with a "momentary" key card inserted therein as far as a halfway position.

Next, to allow the switch 24 to be on only when the card remains inserted (i.e., this is not an "on" hold state but a momentary "on" state), the "momentary" key card 33 (having N-, S-, N- and S-pole magnets buried at respective positions "$a_1$, $c_2$, $a_2$ and $a_3$") shown in FIG. 17 is inserted until it abuts against the abutment portion 9$f$, as shown in FIG. 10. In consequence, the two righthand lock pins 21$a_2$ and 21$a_3$ correspond to magnets of the same polarity buried in the card 33 and are moved upwards by the force of repulsion. Accordingly, the lock pin 21$a_2$ comes upwards out of the hole 8$a_2$ in the lock plate 7, so that the second slider 9-2 is unlocked and becomes slidable.

Figure 11:
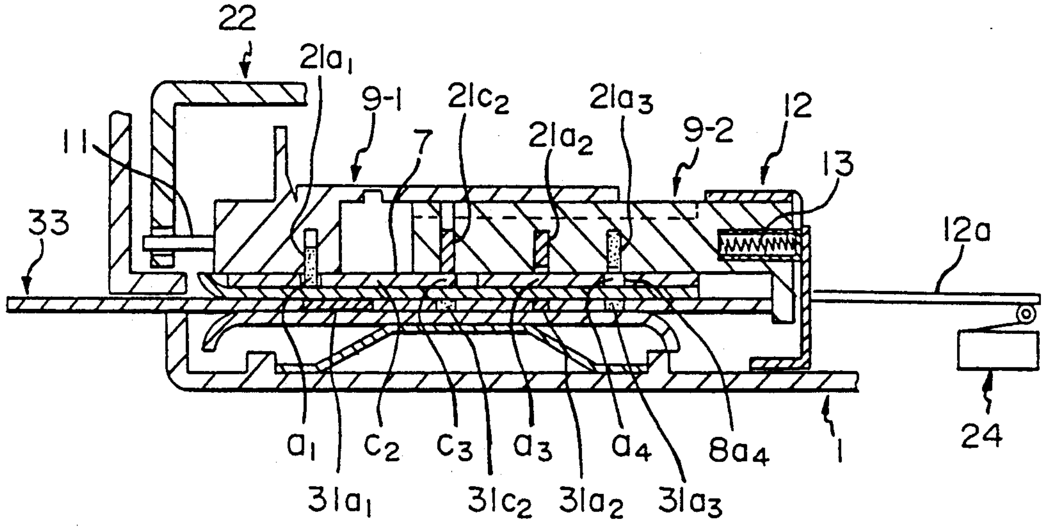
FIG. 11 is a longitudinal sectional view of the switch with the "momentary" key card inserted therein as far as the backward extremity.

If the "momentary" key card 33 is further pushed in to slide backwards together with the second slider 9-1 as one unit, the position shown in FIG. 11, which is approximately the same as that shown in FIG. 8, is reached. Accordingly, the switch 24 is turned on and the green portion 12$c$ is displayed through the window portion 1$g$ in the same way as in the case of FIG. 8.

However, in the case of FIG. 11, the rightmost lock pin 21$a_3$ is still repelled by the magnet of the same polarity buried in the card 33 even after it has moved from the position "$a_3$" to "$a_4$" and does not fall down into the hole 8$a_4$, as stated above. Accordingly, when the card 33 is pulled out from the device in the state shown in FIG. 11, the second slider 9-2 is not held in the "on" position but slid leftwards by the resilient force of the coil spring 13 together with the card 33 to return to the state shown in FIG. 10. When the card 33 is completely pulled out, the lock pin 21$a_2$ falls down into the hole 8$a_2$ in the lock plate 7 again to lock the second slider 9-2. At the same time, the switch 24 turns off and the red portion 12$b$ is displayed through the window portion 1$g$, as a matter of course.

In other words, the "momentary" key card 33 enables the switch 24 to be kept on only when the card remains inserted.

Figure 12:
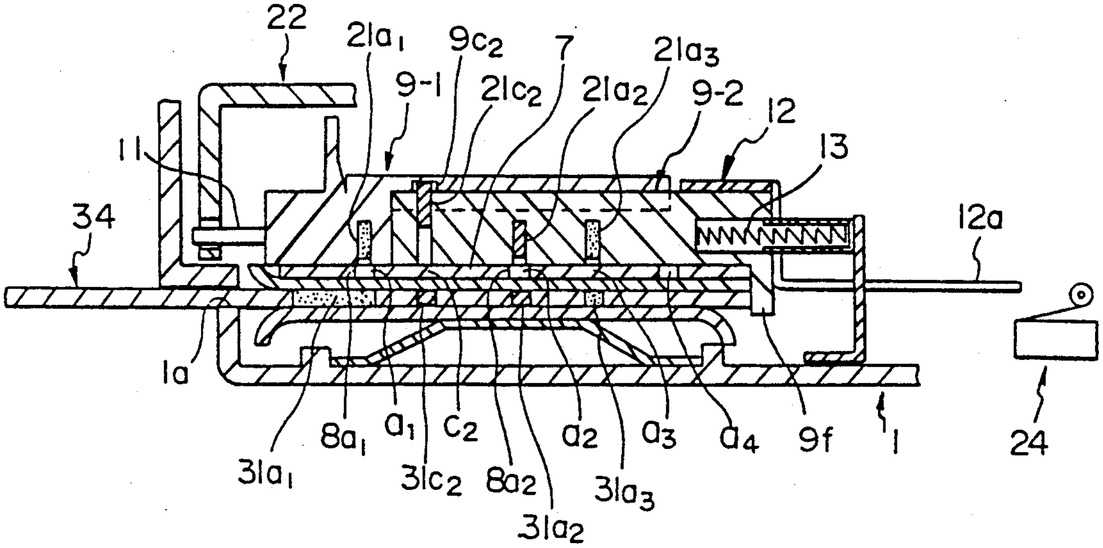
FIG. 12 is a longitudinal sectional view of the switch with an "open" key card inserted therein as far as a halfway position.

The following is an explanation of an operation of removing only the cover casing 1 with the mounting casing 22 left as it is when there occurs a machine failure inside the assembly or it is desired to change the code combination of lock pins (i.e., magnetic code). First, the pair of screws 23 shown in FIG. 1 are removed, and then the "open" key card 34 (having S-, N-, N- and S-pole magnets buried at respective positions "$a_1$, $c_2$, $a_2$ and $a_3$") shown in FIG. 18 is inserted until it abuts against the abutment portion 9$f$, as shown in FIG. 12. In consequence, all the lock pins correspond to the magnets of the same polarity buried in the card 34, so that the lock pins are repelled by the magnets to move upwards. Accordingly, the lock pins, particularly 21$a_1$ and 21$a_2$, come upwards out of the respective holes 8$a_1$ and 8$a_2$ in the lock plate 7, thereby unlocking the first and second sliders 9-1 and 9-2 and enabling them to slide. At the same time, the lock pin 21$c_2$ moves upwards and engages with the guide hole 9$c_2$ of the first slider 9-1, so that the two sliders 9-1 and 9-2 are slidable integrally as one unit through the lock pin 21$c_2$.

Figure 13:
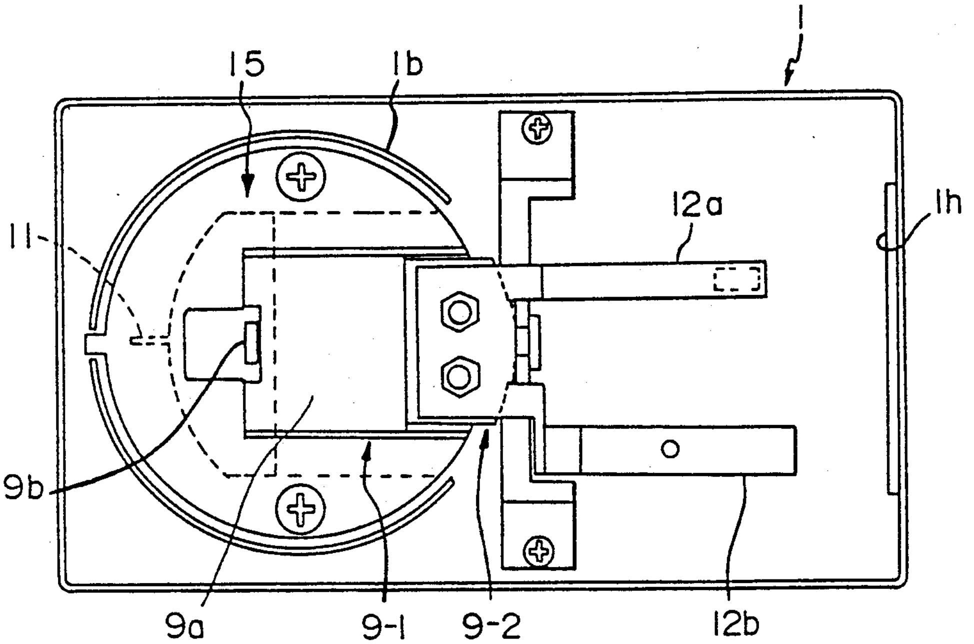
FIGS. 13 and 14 are plan and longitudinal sectional views, respectively, showing the switch with the "open" key card pushed therein as far as the backward extremity.
Figure 14:
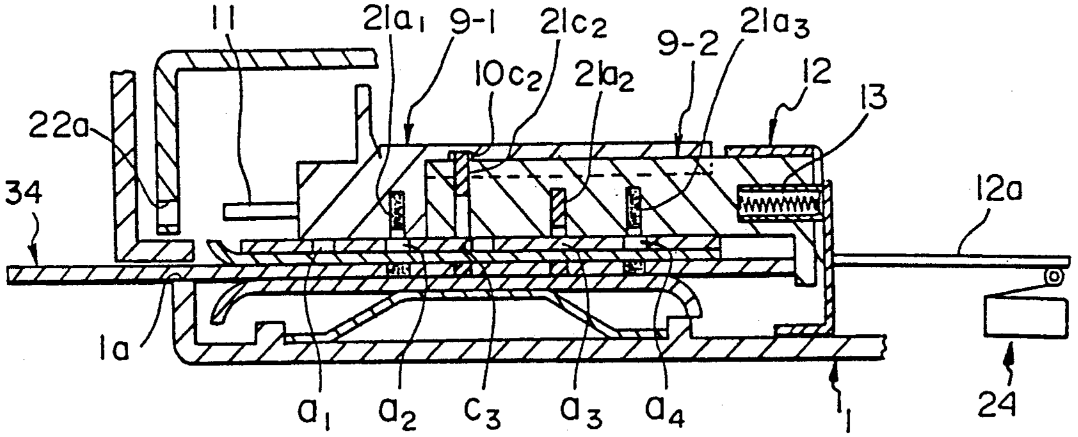

Accordingly, if the "open" key card 34 is further pushed in to slide together with the two sliders 9-1 and 9-2, the position shown in FIGS. 13 and 14 is reached. In consequence, the engagement pin 11 of the first slider 9-1 disengages from the engagement hole 22$a$. Accordingly, if the cover casing 1 is pivoted about the point of engagement between the engagement ridge 1$h$ and the engagement recess 22$d$, the cover casing 1 can be detached easily, and it is possible to take care of any mechanical problem or change the magnetic code.

It should be noted that in FIG. 14 all the lock pins remain repelled upwards and there is therefore no possibility of the lock pins falling down into the through-holes in the lock plate 7. Accordingly, the conditions shown in FIG. 14 cannot be held. Therefore, it is necessary to carry out the operation of detaching and remounting the cover casing 1 with the "open" key card 34 left inserted.

After the cover casing 1 has been remounted, the "open" key card 34 is pulled out. In consequence, the two sliders 9-1 and 9-2 also slide together with the card 34 to return to their previous positions, and the engagement pin 11 reengages with the engagement hole 22$a$. At the same time, all the lock pins 21 return to the conditions shown in FIG. 5. Thereafter, the screws 23 are attached again.

The "on-off" key card 35 shown in FIG. 19 is designed so that, when it is inserted into the assembly in the direction of the arrow "ON" in the figure, a switch "on" hold state can be established in the same way as in the case of the "on" key card 31, whereas, when the card 35 is inserted into the assembly in the direction of the arrow "OFF", a switch "off" hold state can be established in the same way as in the case of the "off" key card 32. In other words, the "on-off" key card 35 has the advantage that the "on-off" functions can be performed with a single card.

As such, it is possible to change properly the positions of the through-holes 8 in the lock plate 7 shown in FIG. 2 and the number and insertion positions of the lock pins 21. For example, when the device is used without changing the positions of the through-holes 8 in the lock plate 7 shown in FIG. 2, the polarities of the lock pins 21 and the magnetic cards 31 to 35 may be all made reverse to those in the above-described embodiment.

In another example, although the positions of the lock pins 21 at the positions "$c_2$, $a_2$ and $a_3$" cannot be changed, the lock pin 21 at the position "$a_1$" for locking the first slider 9-1 can be changed from the position "$a_1$" to any of the positions "$b_1$ to $e_1$". Alternatively, two or more lock pins 21 for locking the first slider 9-1 may be disposed at respective positions selected from among the positions "$a_1$ to $e_1$".

In addition, it is possible to dispose additional lock pins at the positions "$b_2$, $b_3$, $d_2$, $d_3$, $e_2$ and $e_3$", where the through-holes 8 are provided, of all the positions corresponding to the second slider 9-2, besides the positions "$c_2$, $a_2$ and $a_3$" where the lock pins 21 have already been disposed.

Accordingly, even if only one kind of lock plate 7 is employed, a very large number of magnetic codes can be set, so that it is possible to sell a large number of customers magnetic card switches with different magnetic codes obtained from the same type of device by changing (1) the number of lock pins, (2) the positions of lock pins, and (3) the polarities of magnets. If the positions of the through-holes 8 in the lock plate 7 are changed, the device becomes applicable to larger number of customers.

In addition, although in the foregoing embodiment the switch 24 is in an "off" hold state before a magnetic card is first inserted, it should be noted that the arrangement is not necessarily limitative thereto and that the switch 24 may be in an "on" hold state before a magnetic card is first inserted, depending upon the application, as a matter of course. In such a case, by inserting a magnetic card first, the switch can be changed over to an "off" hold state or an "off" state (holdless).

What is claimed is:

1. A magnetic card switch comprising:

casing means attached to a wall of a building or the like;

a slider accommodated in said casing means and slidable in a predetermined direction;

a plurality of magnet lock pins accommodated in a plurality of holes forming a predetermined code, said holes being provided in said slider;

spring means for biasing said slider forwards;

slider lock means for properly locking said slider in either a forward slide position or a backward slide position, said slider lock means being fixedly disposed in said casing along said slider, said slider lock means having a plurality of holes forming a predetermined code, said holes receiving one ends of said magnet lock pins; and a switch disposed to correspond to said slider;

wherein said slider is normally in a non-slidable, locked state at said forward slide position with one end of at least one predetermined lock pin being received in said lock means;

when a first magnetic card is inserted into said casing means, said lock pin of said slider moves in correspondence with a magnetic code of said card to unlock said slider, so that said slider moves to said backward slide position to change said switch from an "off" to an "on" or from an "on" to an "off" state; and when said slider reaches the backward slide position, the lock pin of said slider moves to lock it again, thereby holding said slider in the backward slide position, and thus holding said switch in an "on" or "off" state even after said first magnetic card has been withdrawn.

2. A magnetic card switch according to claim 1, wherein when a second magnetic card is inserted into said casing means when said slider is in the backward slide position, the lock pin of said slider moves in correspondence with a magnetic code of said card to unlock said slider, so that said slider returns to the previous position in response to an operation of pulling out said second magnetic card, thereby returning said switch to the "off" or "on" state.

3. A magnetic card switch according to claim 2, wherein a third magnetic card functions as both said first and second magnetic cards, and when said third magnetic card is inserted into said casing means from one end of said card, said card fulfills the same function as that of said first magnetic card, whereas, when said third magnetic card is inserted into said casing means from the other end of said card, said card fulfills the same function as that of said second magnetic card.

4. A magnetic card switch according to any one of claims 1 to 3, wherein said slider has an indicating portion to indicate "on" and "off" states of said switch.

5. A magnetic card switch according to any one of claims 1 to 3, wherein when a fourth magnetic card is inserted into said casing means when said slider is in the forward slide position, the lock pin of said slider moves in correspondence with a magnetic code of said card to unlock said slider, so that said slider moves to the backward slide position, thereby changing over said switch from an "off" to an "on" or from an "on" to an "off" state;

when said fourth magnetic card reaches a backward position, said slider is not locked; and said slider returns to the previous position in response to an operation of pulling out said fourth magnetic card, thereby returning said switch to the "on" or "off" state.

6. A magnetic card switch comprising:

casing means comprising a mount casing attached to a wall of a building or the like and a cover casing attached to said mount casing;

a pair of first and second sliders accommodated in said casing means and slidable in a predetermined direction independently of each other, said second slider having an abutment portion against which various kinds of magnetic cards abut;

a plurality of magnet lock pins accommodated in a plurality of holes forming a predetermined code, said holes being provided in said first and second sliders;

spring means for biasing said first and second sliders forwards;

slider lock means for properly locking said first and second sliders in either a forward slide position or a backward slide position, said slider lock means being fixedly disposed in said casing along said first and second sliders, said slider lock means having a plurality of holes forming a predetermined code, said holes receiving one end of said magnet lock pins;

means for connecting together said mounting casing and said cover casing by engagement, said means being disposed on said first slider; and a switch disposed to correspond to said second slider;

wherein said first and second sliders are normally in a non-slidable, locked state at said forward slide position with one end of at least one predetermined lock pin being received in said lock means;

when a first magnetic card is inserted into said casing means, the lock pin of said second slider moves in correspondence with a magnetic code of said card to unlock said slider, so that said second slider moves to the backward slide position to change over said switch from an "on" to an "off" or from an "off" to an "on" state; and when a fifth magnetic card is inserted into said casing means, the lock pin of said first and second sliders moves in correspondence with a magnetic code of said card to unlock said first and second sliders from said lock means and lock said sliders to each other, so that said first and second sliders move together as one unit to cancel the engagement between said mount casing and said cover casing made by said connecting means, thereby enabling said cover casing to be removed.

7. A magnetic card switch according to claim 6, wherein when said second slider reaches the backward slide position in response to the insertion of said first magnetic card, the lock pins of said second slider move to lock it again, thereby holding said second slider in the backward slide position, and thus holding said switch in the "on" or "off" state even after said first magnetic card has withdrawn.

8. A magnetic card switch according to claim 7, wherein when a second magnetic card is inserted into said casing means when said second slider is held in the backward slide position, the lock pins of said slider move in correspondence with a magnetic code of said card to unlock said slider, so that said second slider returns to the previous position in response to an operation of pulling out said second magnetic card, thereby returning said switch to the "off" or "on" state.

9. A magnetic card switch according to claim 8, wherein a third magnetic card has the functions of both said first and second magnetic cards, and when said third magnetic card is inserted into said casing means from one end of said card, said card fulfills the same function as that of said first magnetic card, whereas, when said third magnetic card is inserted into said casing means from the other end of said card, said card fulfills the same function as that of said second magnetic card.

10. A magnetic card switch according to any one of claims 6 to 9, wherein said second slider has an indicating portion to indicate "on" and "off" states of said switch.

11. A magnetic card switch according to any one of claims 6 to 9, wherein when a fourth magnetic card is inserted into said casing means when said second slider is in the forward slide position, the lock pin of said second slider moves in correspondence with a magnetic code of said card to unlock said slider, so that said second slider moves to the backward slide position, thereby changing over said switch from an "off" to an "on" or from an "on" to an "off" state;

when said fourth magnetic card reaches a backward position, said second slider is not locked; and said second slider returns to the previous position in response to an operation of pulling out said fourth magnetic card, thereby returning said switch to the "on" or "off" state.

12. A magnetic card switch according to claim 4, wherein when a fourth magnetic card is inserted into said casing means when said slider is in the forward slide position, the lock pin of said slider moves in correspondence with a magnetic code of said card to unlock said slider, so that said slider moves to the backward slide position, thereby changing over said switch from an "off" to an "on" or from an "on" to an "off" state;

when said fourth magnetic card reaches a backward position, said slider is not locked; and said slider returns to the previous position in response to an operation of pulling out said fourth magnetic card, thereby returning said switch to the "on" or "off" state.

13. A magnetic card switch according to claim 10, wherein when a fourth magnetic card is inserted into said casing means when said second slider is in the forward slide position, the lock pin of said second slider moves in correspondence with a magnetic code of said card to unlock said slider, so that said second slider moves to the backward slide position, thereby changing over said switch from an "off" to an "on" or from an "on" to an "off" state;

when said fourth magnetic card reaches a backward position, said second slider is not locked; and said second slider returns to the previous position in response to an operation of pulling out said fourth magnetic card, thereby returning said switch to the "on" or "off" state.

* * * * *